US011325776B1

(12) United States Patent
Mehos et al.

(10) Patent No.: US 11,325,776 B1
(45) Date of Patent: May 10, 2022

(54) MASS-FLOW HOPPER

(71) Applicant: THE YOUNG INDUSTRIES, INC., Muncy, PA (US)

(72) Inventors: Gregory Mehos, Westford, MA (US); Anthony E. Boroch, Montoursville, PA (US)

(73) Assignee: THE YOUNG INDUSTRIES, INC., Muncy, PA (US)

(*) Notice: Subject to any disclaimer, the term of this patent is extended or adjusted under 35 U.S.C. 154(b) by 0 days.

(21) Appl. No.: 17/330,948

(22) Filed: May 26, 2021

(51) Int. Cl.
| | |
|---|---|
| *B65G 53/38* | (2006.01) |
| *B65D 88/70* | (2006.01) |
| *B65D 88/28* | (2006.01) |
| *B65G 53/20* | (2006.01) |
| *B65D 90/02* | (2019.01) |

(52) U.S. Cl.
CPC ........ *B65D 88/706* (2013.01); *B65D 88/28* (2013.01); *B65D 90/02* (2013.01); *B65G 53/20* (2013.01); *B65D 2588/64* (2013.01); *B65D 2590/02* (2013.01)

(58) Field of Classification Search
USPC .......................................................... 406/138
See application file for complete search history.

(56) References Cited

U.S. PATENT DOCUMENTS

| | | | | |
|---|---|---|---|---|
| 2,919,160 A | * | 12/1959 | Blackburn | B65G 53/22 406/134 |
| 3,179,378 A | * | 4/1965 | Zenz | B65G 53/22 118/DIG. 5 |
| 3,188,144 A | * | 6/1965 | Gmur | B65B 1/16 406/90 |
| 3,236,422 A | * | 2/1966 | Bailey | B65D 88/72 406/91 |
| 3,260,389 A | * | 7/1966 | Paton | B65D 88/72 414/416.09 |

(Continued)

FOREIGN PATENT DOCUMENTS

| | | |
|---|---|---|
| CN | 205872928 U | 1/2017 |
| JP | 3761321 B2 | 3/2006 |

OTHER PUBLICATIONS

Dynapore, Fluidizing Media Mechanical Properties, Bulletin Nos. 401-404, Martin Kurz & Co., Inc.

*Primary Examiner* — Joseph A Dillon, Jr.
(74) *Attorney, Agent, or Firm* — Vorys, Sater, Seymour and Pease LLP

(57) ABSTRACT

A mass-flow hopper that stores solid particulates and provides gas assistance to readily discharge the particulate matter. The mass flow hopper has an upper conical section connected via an intermediate section to a lower conical section having a lower discharge orifice. The lower conical section has a frustoconical configured gas impermeable wall lined with a gas permeable fluidizing plate spaced therefrom to define a lower space. The upper conical section slope is steeper than the lower frusto-conically configured gas permeable wall slope. Gas injected into the lower space passes from the lower space through the gas permeable fluidizing plate into the hopper to form a fluidized layer of gas between the solid particulates in the hopper and the gas permeable fluidizing plate. The fluidized layer of gas reduces wall friction within the lower conical section to facilitate discharging the particulates from the hopper.

21 Claims, 4 Drawing Sheets

(56) References Cited

U.S. PATENT DOCUMENTS

| | | | | |
|---|---|---|---|---|
| 3,272,562 | A * | 9/1966 | Kauffman | B65G 53/4691 406/138 |
| 3,639,007 | A * | 2/1972 | Dare | B65D 88/72 105/247 |
| 4,030,633 | A * | 6/1977 | Fisher | B01F 25/82 222/1 |
| 4,632,565 | A * | 12/1986 | Mahoney, Jr. | B01F 25/821 366/182.1 |
| 4,770,611 | A * | 9/1988 | Heyl | B65G 53/525 417/147 |
| 4,848,975 | A | 7/1989 | Alack | |
| 4,889,452 | A * | 12/1989 | Heyl | B65G 53/66 406/122 |
| 5,106,240 | A * | 4/1992 | Dirkse | C10J 3/50 406/138 |
| 5,417,330 | A * | 5/1995 | Heyl | B07B 7/01 209/140 |
| 5,462,351 | A * | 10/1995 | Royal | B65D 88/72 406/137 |
| 5,494,381 | A * | 2/1996 | Heyl | B65G 53/66 406/146 |
| 5,722,801 | A * | 3/1998 | Mahoney, Jr. | B65G 53/66 406/146 |
| 6,055,781 | A * | 5/2000 | Johanson | B65D 88/28 52/192 |
| 6,102,562 | A * | 8/2000 | Bengtson | B01F 25/83 193/34 |
| 6,682,290 | B2 * | 1/2004 | Pfeiffer | B65G 53/20 414/328 |
| 6,719,500 | B2 | 4/2004 | Pfeiffer et al. | |
| 6,722,402 | B2 * | 4/2004 | Ambs | B65B 69/0083 141/286 |
| 7,137,759 | B1 | 11/2006 | Ambs | |
| 7,229,242 | B2 | 6/2007 | Bell et al. | |
| 7,434,709 | B2 * | 10/2008 | Ambs | B65B 69/0091 141/114 |
| 7,476,265 | B2 * | 1/2009 | Firman | B65G 69/182 222/105 |
| 7,547,046 | B2 * | 6/2009 | Wykoff | B65G 53/16 285/129.1 |
| 7,850,047 | B2 * | 12/2010 | Boroch | B65G 53/66 222/57 |
| 9,604,794 | B2 * | 3/2017 | Hauser | B65G 33/14 |
| 9,643,799 | B2 * | 5/2017 | McIlrath | B65D 88/548 |
| 9,833,755 | B2 * | 12/2017 | Mothersbaugh | B01F 25/50 |
| 10,220,980 | B2 * | 3/2019 | Randazzo | B65D 3/06 |
| 10,654,646 | B1 * | 5/2020 | Lin | B65D 88/72 |
| 10,710,795 | B2 * | 7/2020 | Betton | B65D 88/72 |
| 10,994,924 | B2 * | 5/2021 | Rosumowitsch | B65D 88/742 |
| 2010/0014926 | A1 * | 1/2010 | Boroch | B65G 53/521 406/197 |
| 2010/0025433 | A1 * | 2/2010 | Berggren | B65D 88/72 406/136 |
| 2013/0036954 | A1 * | 2/2013 | Hacker | C10J 3/50 110/229 |
| 2015/0314970 | A1 * | 11/2015 | McIlrath | B65D 88/548 406/146 |

\* cited by examiner

MASS-FLOW HOPPER

FIELD OF THE INVENTION

The present disclosure generally relates to hoppers, bins, and silos for storing and discharging particulate matter. While the terms "bin", "hopper", and "silo" may be used interchangeably to describe a vessel that stores and handles particulate matter, the term "hopper" is often utilized to describe any storage vessel with a converging section.

BACKGROUND OF THE INVENTION

A properly designed hopper is one in which the material stored will not form a bridge or arch over its outlet, as arching will prevent the material from discharging. It is well known that providing a large enough outlet will prevent arching. Design methods are available to determine the minimum arching dimension, denoted $B_{min}$ that must be exceeded to prevent a stable arch from developing over the hopper outlet.

If the particulate matter has high cohesive strength, an impractically large hopper outlet may be required to prevent arching. For these materials, fluidization is frequently employed to cause a bulk solid material to behave similar to that of a fluid. Fluidization consists in injecting a gas into the particles at a low velocity, entraining the particles in a rising motion, which is opposed by gravity, causing the gas-particle mixture to behave as a fluid. The flow of gas is generally obtained by passing the fluidizing gas through a porous plate. An orifice centered in the porous plate allows the fluidized matter to be discharged from the hopper. Flow can be modulated by a rotary valve feeder or other device.

To increase the capacity of the silo and to minimize the size of the fluidizing plate, the hopper is fabricated with a section that has converging walls, and a cylindrical section is used between the converging section and the fluidizing plate. If the walls are not steep enough to allow mass flow, given the particulate matter's wall friction, then the size (diameter) of the outlet of the converging section must be large enough to prevent a stable rathole from developing. Mass flow occurs when all material in the hopper is in motion when the hopper is being discharged. Flow will only occur in a central channel if the hopper walls are not steep enough and not low enough in friction to allow flow along the walls (provided that the outlet is large enough to prevent arching). Design methods are available for determining $D_F$, the critical ratholing diameter. The critical ratholing diameter $D_F$ is much greater than the minimum arching dimension $B_{min}$, and if cohesive materials are to be handled, the required diameter can be impractically large.

Design methods are available to determine recommended hopper angle, denoted $\theta_C$. For materials with high wall friction, the hopper angle necessary to allow mass flow can be impractically steep, for example 2-3° from vertical.

U.S. Pat. No. 4,848,975 is directed towards a hopper system comprising a conical hopper (e.g., for flour) and a permeable membrane having a funnel shape, wherein the permeable membrane is secured in position to closely overlie the inner walls of the hopper via an upper and lower clamping mechanism. The membrane has a plurality of pockets extending height wise that may be engaged by stay bars to hold the membrane close to the hopper walls and thereby prevent inward billowing. Pressurized air is introduced into the hopper through the hopper walls and passes inwardly through the membrane with the stay bars inhibiting inward billowing of the membrane as mentioned. After passing through the membrane, the air enters into fluent material contained within the hopper thereby to fluidize the material for efficient unloading from the hopper. This hopper system, however, employs a full surface, flexible textile, fluidizing membrane lining a fully-conical hopper having walls of constant slope.

U.S. Pat. No. 6,719,500 is directed towards a system for pneumatically conveying bulk particulate materials. The system includes a hopper, a material transport line extending from the hopper, and a gas supply line. The hopper includes an upper cylindrical wall formed of a gas impermeable material and an inverted, frusto-conically configured section provided with a lower discharge opening communicating with the inlet of the transport line conduit. Disposed within the hopper and spaced from the upper section and the frusto-conical section, respectively, is an annular wall member and an inverted, frusto-conically configured wall member formed of a gas permeable material. Bulk material disposed in the hopper is intended to be gravity or force fed into conduit. This system employs a full-surface, rigid, metallic, permeable membrane lining a fully-conical hopper having walls of constant slope.

Chinese Patent No. CN205872928 is directed towards a fluidizer device for powdery material having a fluidization plate and intake air modulation subassembly. The fluidization plate includes a fluidization "membrane", which may be made up of polyester weave mesh. This "membrane" is not exposed directly to the stored bulk material but appears to act merely as a filter to prevent entry (backflow) of the bulk material into the gas supply system, as evidenced by the presence of a solid plate with multiple, relatively large holes through it clamped over the outlet side of the permeable membrane. In addition, this fluidizer device does not cover the entire, inner surface of the conical or tapered hopper. Moreover, this fluidizer device creates a ledge on the inner wall of the storage vessel, which not only creates an impediment to material flow, but also a collection point for the bulk material which can lead to cross-contamination or degradation of the stored materials.

Japanese Patent No. JP3761321 B2 is directed towards a powder feeder device having a hopper and a microporous inner membrane within the hopper. Aeration of the powder is achieved by forming a conical wall of a hopper of a fine porous and permeable film, forming a plenum chamber outside the conical wall, and flowing the compressed air against an inner circumferential surface of the conical wall through the fine porous film. A vibration feeder in arranged below the hopper, and the hopper is vibrated making use of the vibration of the vibration feeder. The powder is fluidized by the aeration and the vibration of the vibration feeder, and discharged from the hopper without forming any bridge.

SUMMARY

The present invention provides a hopper for containing and discharging particulate material, the hopper comprising:
an upper converging section formed of:
　a first gas impermeable, preferably frustoconical or cylindrical, outer wall section having an exterior surface and an interior surface, and
　an upper frusto-conical gas permeable wall lining the interior surface of the first gas impermeable outer wall of the upper converging section, the upper frusto-conical gas permeable wall being spaced from the interior surface of the first gas impermeable outer wall of the upper converging section to define an upper space between the upper frusto-conically configured gas permeable wall and the interior surface of the first gas impermeable outer wall of the upper converging section, the upper frusto-conical gas permeable wall having a first slope, a lower converging section formed of:
  a second gas impermeable, preferably frustoconical or cylindrical, outer wall section having an exterior surface and an interior surface, and
  a lower frusto-conically configured gas permeable wall lining the interior surface of the second gas impermeable outer wall of the lower converging section,
  the lower frusto-conical gas permeable wall being spaced from the interior surface of the second gas impermeable outer wall of the lower converging section to define a lower space between the lower frusto-conically configured gas permeable wall and the interior surface of the second gas impermeable outer wall of the lower converging section, the lower frusto-conical gas permeable wall having a second slope, an intermediate connecting section between the upper converging section and lower converging section, wherein an upper end of the intermediate connecting section is in communication with a lower end of the upper converging section, wherein a lower end of the intermediate section is in communication with an upper end of the lower converging section, the intermediate connecting section formed of:
  a third gas-impermeable, preferably cylindrical, outer wall section having opposed upper and lower ends respectively connected to the first gas impermeable outer wall section and the second gas impermeable outer wall section, a discharge section defining a lower discharge opening for discharging solid particles from the hopper, wherein a lower portion of the lower converging section is in communication with the lower discharge opening; and wherein the upper frusto-conically configured gas permeable wall first slope is steeper than the lower frusto-conically configured gas permeable wall second slope, wherein the upper frusto-conically configured gas permeable wall is configured to fluidize material located above the upper frusto-conically configured gas permeable wall in a manner to facilitate passage of solid particles through the upper converging section to the intermediate section, wherein the lower frusto-conically configured gas permeable wall is configured to fluidize material located above the lower frusto-conically configured gas permeable wall in a manner to facilitate passage of the solid particles through the lower discharge opening of the lower converging section.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates to hoppers for storing and discharging particulate matter, and, more particularly, to such hoppers with improved mass flow and methods for the same.

The present invention described herein provides a hopper to store particulate matter that can be readily discharged using gas assistance. As will be described below, the presently disclosed subject matter will be useful for utilizing fluidizers having relatively small-diameter plates to process cohesive powders without formation or development of an arch or a stable rathole.

In particular, the present invention described herein provides a hopper that stores particulate matter and that can be readily discharged using gas assistance and with improved mass flow. The hopper is provided with a frustoconical gas permeable membrane in an upper converging section and a frustoconical gas permeable fluidization plate in a lower converging section. The fluidizing plate at the bottom of the hopper contains a centered orifice for discharging the particulate matter. The diameter of the centered orifice is specified for the desired discharge rate of the particulate matter.

A benefit of the presently disclosed subject matter is that it is operational with particulate matter (powder) having both high cohesive strength and high wall friction. During use, fluidizing gas passes through the frustoconical gas permeable membrane and the frustoconical gas permeable fluidization plate. A small layer of gas forms between the particulates and the respective gas permeable wall. This greatly reduces hopper wall friction and headroom requirements when compared to non-fluidizing mass flow hoppers and to hoppers only passing fluidizing gas through a frustoconical gas permeable fluidization plate in a lower converging section. As such, the slope angle formed by the converging sections can be shallow and still allow mass flow, while preventing the development of a rathole.

Figure 1:
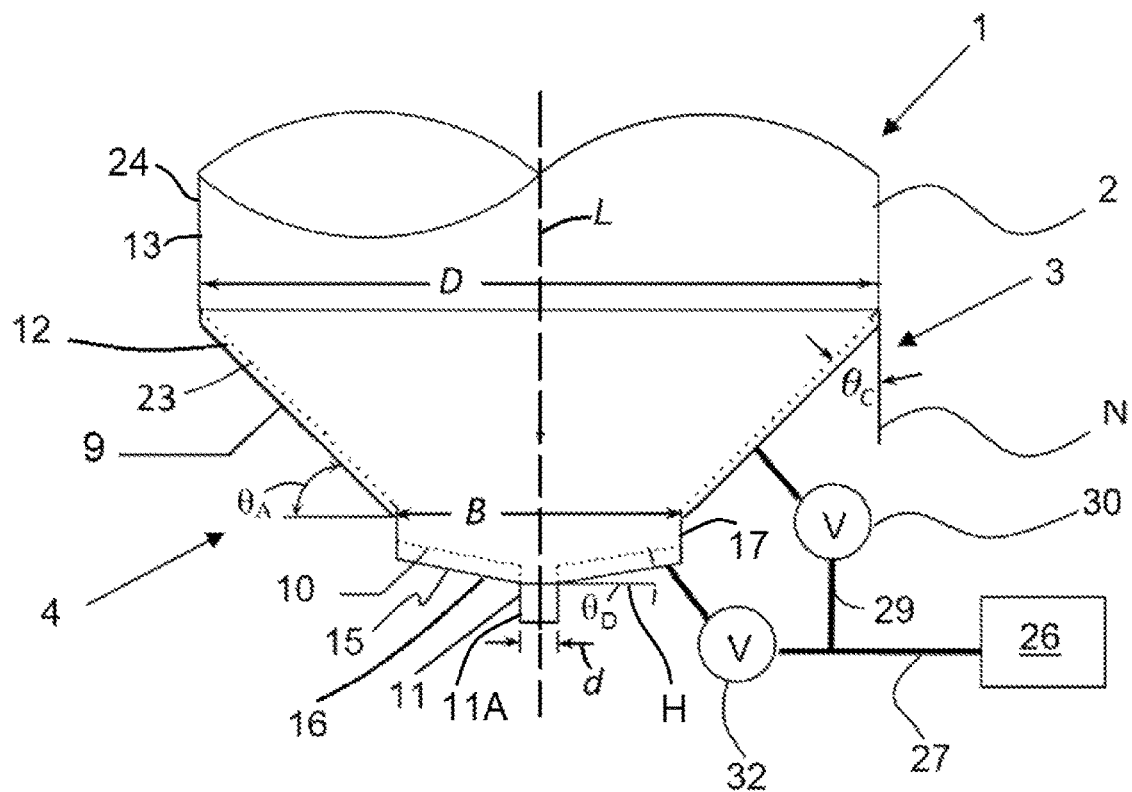
FIG. 1 schematically illustrates a hopper utilizing a frustoconical gas permeable membrane in an upper converging section and a frustoconical gas permeable fluidization plate in a lower converging section for passing fluidizing gas through the a frustoconical gas permeable membrane and the frustoconical gas permeable fluidization plate to promote the flow of particulate matter according to the present invention.

FIG. 1 schematically illustrates an example hopper assembly 1 of the present invention. The depicted hopper assembly 1 is just one example of a hopper assembly that can suitably incorporate the principles of the present disclosure. Indeed, many alternative designs and configurations of the hopper assembly 1 may be employed, without departing from the scope of this disclosure. As hereinafter described, the hopper assembly 1 is configurable as a fluidization hopper and may be utilized in a bulk particulate material handling system.

FIG. 1 illustrates the hopper assembly 1 comprising a vessel (or hopper) 2 comprising an upper converging section 12 that is lined with a rigid, metallic, permeable membrane 23 and a lower converging section 15 that is similarly lined with a rigid, metallic, permeable fluidization plate 10. Thus, the hopper assembly 1 of FIG. 1 generally comprises an upper converging section 12 of steeper slope and lined with a rigid, metallic, permeable membrane 23, and a lower converging section 15 of shallow slope and lined with a rigid, metallic, permeable fluidization plate 10, wherein the upper and lower converging sections 12, 15 are separated from each other by an intermediate section 17.

In particular, the hopper 2 has outer walls made of gas impermeable materials. For example, the hopper 2 outer walls may be made of a gas impermeable metal such as stainless steel, carbon steel (with or without a coating) or aluminum, or other gas impermeable material such as plastic, etc. The hopper 2 has a longitudinal axis "L" (FIG. 2) parallel to a normal (or perpendicular) vector "N" as illustrated.

The hopper 2 comprises an upper cylindrical section 13 of gas impermeable material attached to the upper converging section 12 having an upper end 3 and a lower end 4. FIG. 1 shows the upper converging section 12 comprises a conically shaped outer sidewall 9 (i.e., a downwardly sloping sidewall) of gas impermeable material. The upper cylindrical section 13 has a diameter "D". The upper converging section 12 sloping sidewalls 9 converge such that the diameter of the upper converging section 12 sloping sidewalls 9 progressively decreases towards the lower end 4 of the upper converging section 12. The outlet proximate the lower end 4 of the converging section 12 has a diameter "B". The upper converging section 12 also contains a conical (frustoconical) gas permeable membrane 23.

The hopper 2 also has the intermediate section 17, the lower converging section 15, and a hopper outlet (discharge) section 11. The upper converging section 12 is provided between the cylindrical section 13 and the intermediate section 17. The lower converging section 15 is between the intermediate section 17 and the hopper outlet section 11. Thus, the lower converging section 15 is separated from the upper converging section 12 via the intermediate section 17.

The intermediate section 17 comprises cylindrical gas impermeable outer sidewalls. In the hopper 2 of FIG. 1, the intermediate section 17 separating the upper and lower converging sections 12, 15 is unlined. However, intermediate section 17 may optionally be lined with gas permeable material (See for example FIG. 4).

The lower converging section 15 has outer sidewalls 16 of gas impermeable material. Preferably, as in FIG. 1, the outer sidewalls 16 are frusto-conically configured sloping sidewalls. The outer sidewalls 16 of gas impermeable material have at its lower end an outlet communicating with the opening of the discharge section 11.

The lower converging section 15 also has a frusto-conically configured wall (fluidizing plate 10) formed of a gas permeable material (for example a gas permeable membrane) spaced from the gas impermeable outer sidewalls 16. Thus, in the lower converging section 15 the fluidizing plate 10 is provided over the gas impermeable sidewalls 16 such that the fluidizing plate 10 lines the gas impermeable sidewalls 16 in a spaced relationship. This provides a space between the gas impermeable outer sidewalls 16 and the fluidizing plate 10. A gas supply line 27 is provided for feeding fluidizing gas to the space between the gas impermeable outer wall 16 and the gas permeable fluidizing plate 10.

Figure 2:
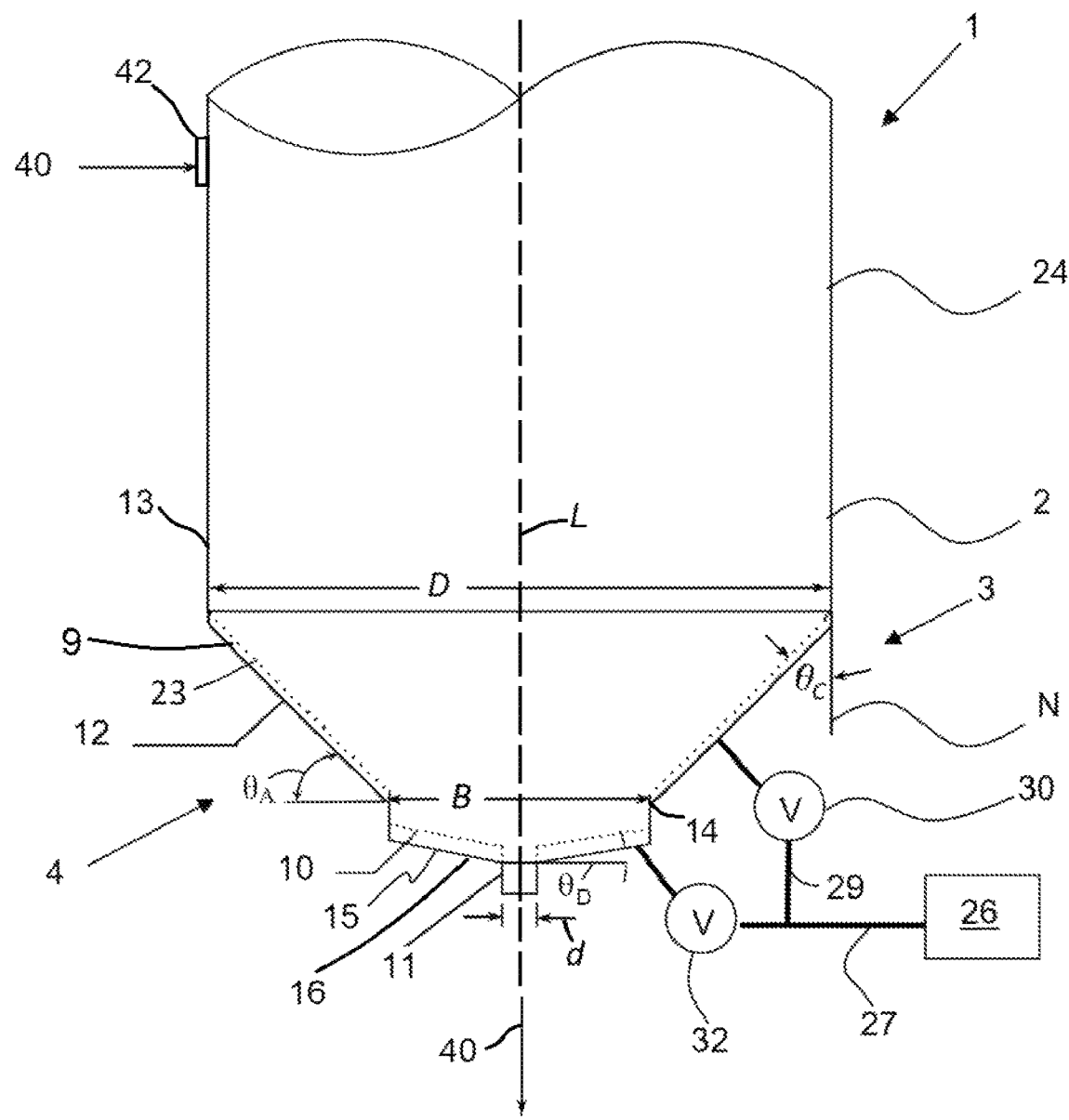
FIG. 2 illustrates the hopper of FIG. 1 but shows more of its upper cylindrical section.

The hopper 2 may have one or more openings for admitting solid particles and one or more openings for admitting fluidizing gas. For example, the cylindrical section 13 may be open to the atmosphere at the upper end 24 or have a solid particle inlet opening 42 through the cylindrical sidewalls 24 of the cylindrical section 13 (FIG. 2). In addition, an enclosed hopper with a top cover (not shown) would typically have a vent for exhaust of spent fluidizing air/gas and for air/gas displaced by incoming solids.

In the apparatus of FIG. 1 the hopper outlet section 11 includes a discharge conduit 11A having cylindrical sidewalls defining a discharge opening (orifice) having a diameter "d" at the bottom of the hopper 2 for discharging the particulate matter from the hopper assembly 1, e.g., into other downstream equipment or for downstream processing. In the illustrated example, the discharge conduit 11A is provided through both the fluidizing plate 10 and lower converging section 15 walls 16. Here, the discharge conduit 11A is centrally located due to the uniformly sloping sidewalls of the fluidizing plate 10 and the gas impermeable outer sidewalls 16. FIG. 1 shows the axis of diameter B concentric with the axis of diameter "d". However, if desired, the hopper could be non-concentric. e.g., the axis of diameter B could be offset from the axis of diameter "d".

As will be appreciated, the discharge orifice 11 may be connected to a transport line (not illustrated), which may thereafter convey the bulk material to another container or a bulk particulate material handling system. The central orifice 11 may be selectively opened or closed, for example, via a valve (not illustrated), that allows the bulk material to flow into the transport line when opened. Material contained within the hopper 2 is thus adapted to gravity flow downward through the hopper 2, into and through the central orifice 11, after which it may be fed downstream to the bulk particulate material handling system.

Slopes

FIG. 1 shows the converging sections 12, 15 are separated by the gas impermeable intermediate section 17 such that the hopper 2 does not have a constant slope. The sloping sidewalls 9 of the upper converging section 12 may be steeper than the sloping sidewalls 16 of the lower converging section 15.

FIG. 1 shows the sidewalls 16 of the lower converging section 15 are of gas impermeable material and oriented at a slope angle $\theta_D$ between ten degrees and fifteen degrees (10°-15°) as measured from a horizontal vector H. Thus, when the hopper assembly 1 is in operation this is measured relative to a horizontal plane.

FIG. 1 shows the upper converging section 12 has a constant slope. The lower converging section 15 has a constant slope that is typically shallower than the slope of the upper converging section 12. Thus, slope angle $\theta_D$ of the lower converging section 15 is less than slope angle $\theta_A$ of the upper converging section 12. Slope angle $\theta_A$ is shown in FIG. 1 and discussed in more detail below.

FIG. 1 shows a horizontal slope angle $\theta_A$ of converging section 12 that is relative to a horizontal plane transverse to the longitudinal axis "L" and the vector "N". As the horizontal slope angle $\theta_A$ from the horizontal plane H increases, the steepness of the slope of the sloping sidewalls 9 of the upper converging section 12 increases. Thus, the rate of mass flow down along the sloping sidewalls 9 of the upper converging section 12 decreases as the value of the horizontal slope angle $\theta_A$ is decreased. However, rate of mass flow increases as the value of the horizontal slope angle $\theta_A$ is increased towards ninety degrees (90°).

FIG. 1 also shows a vertical slope angle $\theta_C$ that is relative to vertical vector "N" parallel to the longitudinal axis "L". The slope of the sloping sidewalls 9 of the upper converging section 12 is defined by a vertical slope angle $\theta_C$, which is measurable between the sloping sidewalls of the converging section 12 and the normal (or perpendicular) vector N of the hopper assembly 1. The vertical slope angle $\theta_C$ equals 90° minus the horizontal slope angle $\theta_A$. In the illustrated example, the sloping sidewalls 9 of the converging section 12 become steeper as the value of the slope angle $\theta_C$ approaches zero degrees (0°). However, the sloping sidewalls 9 of the converging section 12 become less steep as the value of the slope angle $\theta_C$ is increased therefrom towards ninety degrees (90°). Rate of mass flow down along the sloping sidewalls 9 of the converging section 12 decreases as the value of the slope angle $\theta_C$ is increased towards ninety degrees (90°). Conversely, rate of mass flow increases as the value of the slope angle $\theta_C$ is decreased towards zero degrees (0°).

In the absence of a fluidizer (below-discussed frusto-conically configured gas permeable membrane 23), particulate material stored in the hopper 2 may form a bridge or stable arch (i.e., referred to as arching) over the hopper outlet 14, thereby blocking the orifice 11 and preventing discharge of the material from the hopper assembly 1. Arching is preventable by designing the hopper 2 such that the diameter B of the hopper outlet 14 has a minimum arching dimension $B_{min}$. Providing the hopper 2 with the hopper outlet 14 having a dimension greater than or equal to the minimum arching dimension $B_{min}$ inhibits formation of a stable arch and will help ensure adequate material flow. However, some particulate materials have a high enough cohesive strength such that the minimum arching dimension $B_{min}$ would need to be impractically large to prevent arching. In these cases, fluidization may be employed such that the high cohesive strength particulate material behaves similar to a fluid. There are laboratory tests that can be used to measure wall friction and cohesive strength (such as ASTM D6128-16, Standard Test Method for Shear Testing of Bulk Solids Using the Jenike Shear Tester, ASTM International, West Conshohocken, Pa., 2016). How high the wall friction must be to require exceptionally steep slope angle $\theta_C$ depends on the powder's internal friction. Whether or not a powder's cohesive strength is so high that impractical hopper outlet dimensions are required depends on its bulk density.

Thus, when designing the hopper assembly 1, the diameters D, B, d, the slope angle $\theta_C$ and the slope angle $\theta_D$ are selected to allow the desired discharge rate of the particulate matter therefrom. Moreover, the slope angle $\theta_C$ of the upper converging section 12 sidewalls is selected such that the sloping sidewalls of the converging section 12 are sufficiently steep to allow desired mass flow. In addition, the diameter D of the cylindrical section 13 is also be selected to ensure that the cylindrical section 13 is large enough to provide the desired hopper capacity within a reasonable height.

However, in some instances, In the absence of a fluidizer (below-discussed frusto-conically configured gas permeable membrane 23), to handle a particulate material having a certain combination of wall friction and cohesive strength, the value of the vertical slope angle $\theta_C$ of the gas impermeable sloped sidewalls 9 and the gas permeable sidewalls 23 is too large. Thus, it is not practical to make the sloping sidewalls of the upper converging section 12 steep enough to allow sufficient mass flow (i.e., the horizontal slope angle $\theta_A$ of the gas impermeable sloped sidewalls 9 and the gas permeable sidewalls 23 is too gradual or shallow). To compensate for this the outlet diameter B of the upper hopper may be enlarged to avoid the particulate matter forming a stable rathole. The particular outlet diameter B of the upper hopper that is sufficiently large to avoid formation of the rathole at a particular slope angle $\theta_C$ is referred to as the critical rat-holing diameter $D_F$. As illustrated, the critical rat-holing diameter $D_F$ will be larger than the minimum arching dimension $B_{min}$. However, where the particulate matter has high cohesive strength, the critical rat-holing diameter $D_F$ may be impractically large. Where the sidewalls of the gas impermeable sloped sidewalls 9 and the gas permeable sidewalls 23 of the upper converging section 12 are not steep enough to allow for adequate mass flow (i.e., the slope angle $\theta_C$ is too large), the diameter D of the cylindrical section 13 should at least equal the critical rat-holing diameter $D_F$.

In the absence of a fluidizer (below-discussed frusto-conically configured gas permeable membrane 23), for particulate material having high wall friction, the vertical slope angle $\theta_C$ for allowing adequate mass flow may be impractically steep, for example, two to three degrees (2°-3°) from the normal vector N.

To solve this problem, as well as enhance flow of other particulate material in general, FIG. 1 illustrates the hopper assembly 1 configured to provide enhanced fluidization to the particulate material stored therein, according to one or more embodiments of the present disclosure. The present hopper is suitable with powders having high cohesive strength and high wall friction, unlike prior hopper assemblies, which may otherwise require exceptionally steep walls due to the particulate material's wall friction and/or impractical hopper outlet dimensions due to the powder's cohesive strength and bulk density.

The hopper assembly 1 includes above-discussed upper converging section 12 which has a frusto-conically configured gas impermeable outer wall 9 having at its lower end an outlet communicating with the lower converging section 15, and a frusto-conically configured gas permeable wall 23 (gas permeable membrane) formed of a gas permeable material spaced from the gas impermeable wall section. The hopper assembly 1 also includes a branch line 29 intercommunicating with the main gas supply line 27 and the space between the wall sections 12, 23. Flow in the gas lines may be controlled by valves 30, 32.

Thus, the hopper assembly 1 of FIG. 1 includes the permeable membrane 23 provided on but spaced from an interior surface of the sloping sidewalls 9 of the upper converging section 12 to define a space between the permeable membrane 23 and the sloping gas impermeable sidewalls 9 of the upper converging section 12. Gas from the branch line 29 intercommunicating with the main gas supply line 27 is injected into the space between the permeable membrane 23 and the gas impermeable sloping sidewalls 9 of the upper converging section 12 and passes through the gas permeable membrane 23. This forms a layer of gas between the permeable membrane 23 at the sloping sidewalls 9 of the upper converging section 12 and the particulate material to fluidize the particulate material in the hopper 2 above the permeable membrane 23. This layer of gas that forms between the gas permeable membrane 23 and the particulates greatly reduces wall friction. This enhances flow of the particulate material therein such that the particulate matter has sufficient fluid flow within the upper converging section 12 and is discharged therefrom at a sufficient rate. With this design, the conical side walls 9 of the upper converging section 12 may be shallower (i.e., the slope angle $\theta_C$ may be relatively or significantly larger) but still provide sufficient mass flow, while preventing formation of a rathole.

A typical range of the horizontal slope angle $\theta_A$ is 40 to 70 degrees, preferably 40-50° and, more preferably about 45°. To allow mass flow for some combinations of bulk material and wall material, the horizontal slope angle 6A may be as high as between 70 to 80 degrees.

In the present invention a typical range of vertical slope angle $\theta_C$ is 20 to 50 degrees, preferably 40-50° and, more preferably about 45°. Other ranges may be utilized. In the absence of a fluidizer (above discussed permeable membrane 23) of the present invention, to allow mass flow, the slope angle $\theta_C$ would be steeper, typically ranging between 10 and 20 degrees. For some combinations of bulk material and wall material, the slope angle $\theta_C$ must be as low as 3-10° to allow mass flow.

In the apparatus shown in FIG. 1, the gas permeable membrane 23 follow the slope of the gas impermeable walls 9. Thus, the gas impermeable outer sidewalls 9 and the gas permeable membrane 23 may have the same slope angle $\theta_C$. Thus, the gas impermeable wall 9 and the gas permeable membrane 23 are oriented at the slope angle $\theta_C$ in the range from 20 to 50 degrees, preferably 40-50° and, more preferably 45°.

Figure 4:
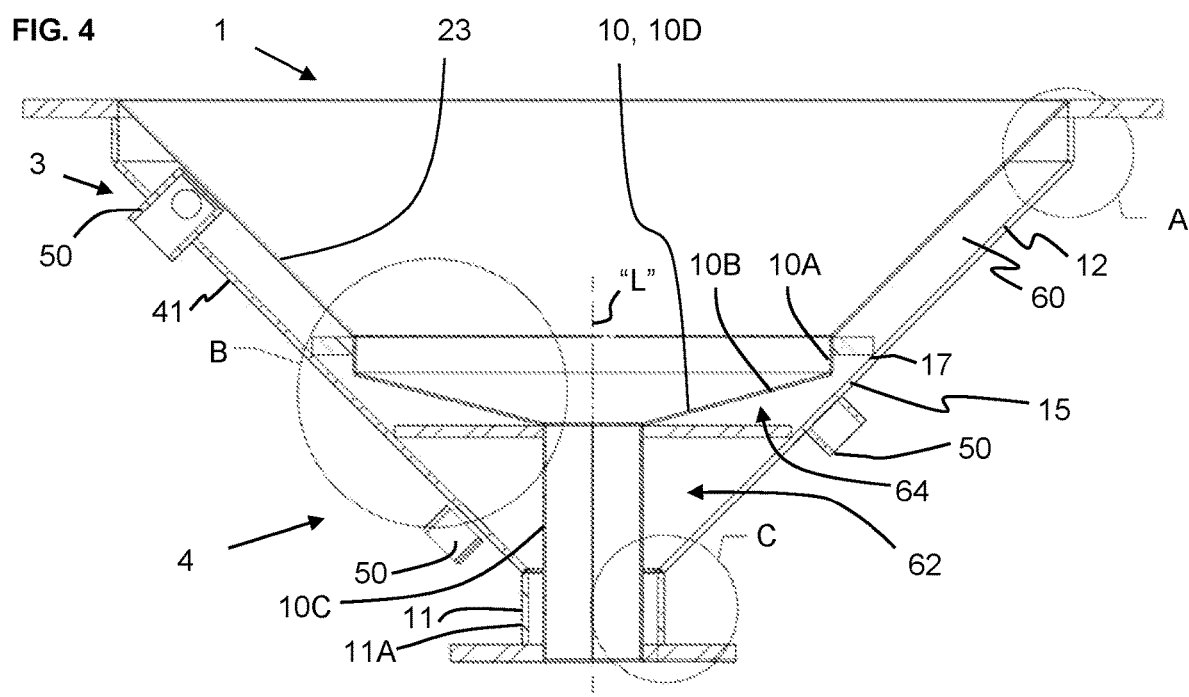
FIG. 4 is a cross-sectional side view of the hopper assembly of FIG. 3.

However, the invention also contemplates the gas permeable member 23 not following the slope of the gas impermeable outer sidewalls 9 (See FIG. 4). Regardless of whether the gas permeable member 23 follows the slope of the gas impermeable sidewalls 9, the gas permeable member 23 is oriented at slope angles in the ranges of slope angles $\theta_A$, $\theta_C$ discussed above for the gas impermeable sidewalls 9. Thus, the gas permeable membrane 23 is oriented at the horizontal slope angle $\theta_A$ in the range from 40 to 70 degrees, preferably 40-50° and, more preferably about 45°. Also, the gas permeable membrane 23 is oriented at the slope angle $\theta_C$ in the range from 20 to 50 degrees, preferably 40-50° and, more preferably 45°.

In the apparatus shown in FIG. 1, the fluidizing plate 10 follows the slope of the gas impermeable walls 16. Thus, the gas permeable sidewalls of the fluidizing plate 10 of the lower converging section 15 are oriented at the slope angle $\theta_D$ between ten degrees and fifteen degrees (10°-15°).

However, the invention also contemplates the fluidizing plate 10 not following the slope of the gas impermeable walls 16 (See FIG. 4). Regardless of whether the fluidizing plate 10 follows the slope of the gas impermeable walls 16, the fluidizing plate 10 is oriented at a slope angle $\theta_D$ between ten degrees and fifteen degrees (10-15°) as measured from a horizontal vector H. Thus, the gas permeable fluidizing plate 10 of the lower converging section 15 is provided at a shallower orientation than the gas permeable sidewalls 23 of the upper converging section 12.

Gas Permeable Materials

Typically the gas permeable member 23 and the fluidizing plate 10 are made of a rigid material, for example, stainless steel. Billowing of the fluidizing plate 10 at its intended operating pressures is inhibited by providing the gas permeable member 23 and the fluidizing plate 10 as a rigid member (such as a rigid gas permeable membrane). The gas permeable member 23 and the fluidizing plate 10 may be comprised of two or more layers of the same or different material. If the fluidizing plate 10 is comprised of two or more layers, each layer of the fluidizing plate 10 may have a different mesh size or each layer of the fluidizing plate 10 may have the same mesh size. The layers of the fluidizing plate 10 may be compressed and welded together to form a rigid sheet. In this manner, the permeability of the plate 10 may be controlled and be substantially uniform over the enter surface of the sheet.

The gas permeable fluidizing plate 10 and the gas permeable fluidizing membrane 23 typically comprise a porous metal plate. A typical suitable porous metal plate may be made of porous stainless steel plate such as TRANSFLOW aeration media or fluidizing membrane as supplied by The Young Industries, Inc. of Muncy, Pa. 17756). TRANSFLOW is a registered U.S. trademark of Young Industries, Inc. (Registration No. 1,796,761).

The TRANSFLOW fluidizing plate 10 and the permeable fluidizing membrane 23 (or aeration media) are constructed of porous 316 stainless steel with a smooth finished contact surface configured to prevent powders and bulk solids from adhering. This configuration produces an evenly distributed layer of air that separates the bulk material from the media. An analogy of its operation is that it works similar to an air hockey table. The TRANSFLOW porous steel fluidizing plate 10 and the permeable fluidizing membrane 23 are able to withstand temperatures of up to 1000 degrees F., resist corrosion, and utilize typically only 3-5 psi of air or gas pressure above the internal pressure in the material flow channels above their respective surfaces. The maximum recommended fluidizing relative supply pressure is 15 psi. Alternatively, the fluidizing membrane can be a fluidizing plate or fluidizing screen provided as fluidizing plate 10 and/or the permeable fluidizing membrane 23.

Preferably the fluidizing plate 10 and the permeable fluidizing membrane 23 are made of TRANSFLOW porous steel. However, instead of using the TRANSFLOW porous steel for fluidizing plate 10 and the permeable fluidizing membrane 23, the fluidizing plate 10 and the permeable fluidizing membrane 23 may be, for example, a porous plate such as porous metal plate, porous stainless steel plate, porous aluminum plate, porous brass plate, porous ceramic plate, porous resin plate, porous composite plate (e.g. carbon, graphite, KEVLAR aramid, Boron), porous fiber plate, porous fiberglass plate, porous ceramic. Another alternative is to substitute a screen, or screen material for the TRANSFLOW porous steel. In another alternative, the fluidizing plate 10 and the permeable fluidizing membrane 23 can be a fluidizing plate made (e.g. machined, drilled, water jetted, laser cut) to have multiple holes, slots, passageways and/or jets or passageways extending through the fluidizing plate. The holes, slots, passageways and/or jets can be in a particular pattern (e.g. matrix, radii, star, concentric circles). Further, the configuration of the holes, slots, passageways, and/or jets (e.g. different size, different profile, different cross-sectional shape, tapering, particular surface roughness and/or surface finish in holes, slots, passageways, and/or jets or outer surfaces) can be tailored to create various fluidizing effects.

In some embodiments, the permeable membrane 23 is made of a rigid material, for example, stainless steel which is much more heat resistant and more resistant to product infiltration (blinding) which affects the membrane's flow resistance over time. However, other metallic or non-metallic materials may be utilized. The permeable membrane 23 may be made of the same material as the fluidization plate (the lower permeable membrane) 10. Or, the permeable membrane 23 may be made of a different material than that of the fluidization plate (the lower permeable membrane) 10.

Billowing of the permeable membrane 23 at its intended operating pressures is inhibited by providing the membrane 23 as a rigid member. In some embodiments, the permeable membrane 23 is comprised of two or more layers of material. Each layer of the permeable membrane 23 may have a different mesh size. Or, two or more layer of the permeable membrane 23 may have the same mesh size. Typically, if the permeable membrane 23 comprises multiple layers then the layers of the permeable membrane 23 are compressed and welded together to form a rigid sheet. In this manner, the permeability of the membrane 23 may be controlled over the enter surface of the sheet.

Various means may be utilized to secure the permeable membrane 23 on the interior surface of the upper converging section 12. For example, one or more connecting structures may be provided on the interior surface of the upper converging section 12 and the permeable membrane 23 may be attached to such structures via fusion welding to suitable connecting structures. Similarly, the fluidization plate 10 may be fusion welded to suitable structures protruding from the interior surface of the lower converging section 15.

Gas Feeding

Various means may be utilized to provide gas to the hopper assembly 1 to provide a fluidized gas boundary layer above the membranes 23, 10. For example, the hopper assembly 1 may include a gas supply system 26 comprised of piping, pressure regulator(s), manifolds, valves, nozzles (e.g., adjustable nozzles), connections (e.g., pipe couplings), etc. for routing or piping filtered air or other suitable gas (e.g., nitrogen) into the interior of the hopper 2. For example, suitable holes or apertures (not shown) may be provided in the walls of the hopper 2 (e.g., at the upper and lower converging sections 12, 15) extending between exterior and interior surfaces of the hopper 2, and piping may be coupled to such holes at the exterior of the hopper 2 such that gas may be supplied through the piping and couplings and injected into the interior of the hopper 2 via such holes. In this manner, the gas may be introduced within the hopper 2 in the area (or space) between the impermeable inner surface of the hopper 2 and the correspondingly facing surface of gas permeable membrane 23 and between impermeable inner surface of lower converging section 15 and correspondingly facing surface of permeable membrane 10, where such area (or space) between the gas impermeable and gas permeable materials is a passageway for fluidizing gas to flow and thereby fluidize the particulate material moving through the hopper 2. The gas may be supplied/injected into the space between the hopper 2 and the gas permeable fluidization plate 10 and gas permeable membrane 23 at a controlled pressure and at a controlled flow rate. The valves may assist in controlling the gas rate. Also the couplings where the gas lines feed the hopper may be provided, for example, with nozzles that typically provide a flow regulating and distributing (diffusing) function. Where utilized, nozzles may aid in the even distribution of fluidizing gas over the permeable membrane's surface.

Typically the permeable membrane 23 (sometimes referred to as an upper permeable membrane) and the fluidization plate 10 (sometimes referred to as a lower permeable membrane) are each a rigid, metallic, permeable membrane that is in direct contact with the stored bulk particulate material over the entire interior surface of the upper and lower converging sections 12, 15. Each of the gas permeable material members 23, 10 may correspond in shape with the respective gas impermeable outer sidewalls 16, 9 of the converging section 12, 15 within which it is arranged. For example, the upper and lower converging sections 15, 12 may be provided as frusto-conical shaped sidewalls and the respective permeable members 10, 23 may be correspondingly shaped frusto-conical shaped sidewalls sized and shaped to fit within their respective converging section 12, 15 such that an air gap or area is provided there-between as described above. Thus, the, upper and lower converging sections 12, 15 may be configured to define gas spaces or areas in which gas may be supplied or injected for fluidizing the particulate material. This direct, total surface contact enables the fluidizing gas to be evenly distributed over the stored bulk material's contacting surface with the components within the interior volume of the hopper 2 detailed above. With this arrangement, the evenly distributed film of gas and fluidized bulk material at the face of the permeable members (10, 23) provides a very low friction factor between the stored material and the members (10, 23), which enhances the flow of the bulk material through the hopper 2. In addition, the introduced gas also serves to provide interstitial gas to the bulk material as it becomes more fluidized, thus improving the bulk material's flow from the outlet 11 of the hopper 2 and thereby inhibiting back-flow into the outlet 11 as the bulk material expands or dilates.

The gas supply line 27 is adapted to be connected to a source of gas, for example the gas supply system 26, which may be pressurized, for example, at a pressure in the range of 80 to 100 psi. The gas supply system 26 may have regulated pressure to ensure consistent air flow through valves 30, 32. The gas is typically air, but if desired may be inert gas, for example nitrogen. Also, the supplied air/gas may be sufficiently filtered and dried to prevent blinding of the fluidizing media and prevent moisture condensation. The gas supply system 26 functions to provide gas pressure for the gas, passing through the gas permeable members 10, 23, to facilitate conveying material through upper and lower conical sections 12, 15. The gas supply system 26 may include a network of one or more supply lines 27 for supplying gas and having such gas injected into the area (gap or space) defined between the gas permeable members 10, 23 and their respective gas impermeable conical sections 12, 15. One or more valves 30, 32 may be provided for controlling the flow or supply of such gas into the areas.

Here, for example, a first valve 32 is provided for controlling supply of gas into a first space defined between the gas permeable fluidizing plate 10 and the respective gas impermeable lower converging section 15. A second valve 30 is provided for controlling supply of gas into a second space defined between the upper gas permeable membrane 23 and the respective upper gas impermeable converging section 15.

Gas under pressure, usually air, is injected into the first and/or second space through valves 30, 32, by means of a nozzle (not illustrated). Thus, the supply lines 27 may lead from a source or supply of pressurized gas of the gas supply system 26, and terminate at one or more nozzles that are arranged to inject the pressurized gas into the first space (between the lower gas permeable material 10 and the respective lower gas impermeable converging section 15) and second space (defined between the upper gas permeable membrane 23 and the respective gas impermeable converging section 12). Additional nozzles may be provided to provide air flow where it may be desirable. The extent of the projection of nozzles into the first and second spaces may be varied manually or mechanically to correspondingly alter the flow conditions of material in the first and second spaces. In the operation of the gas system, fluidizing gas is supplied to fluidizing gas passages (areas) of the hopper 2 (between the gas permeable members 10, 23 and their corresponding gas impermeable materials 12, 15) upon opening valves 30, 32. The flow of the particulate material through the hopper 2 is enhanced by fluidizing gas flowing through the gas permeable members 10, 23 of conical sections 12, 15, which forms a nearly frictionless boundary layer of highly fluidized material. The nozzles may be variously provided, for example, as described below with reference to FIGS. 3 and 4.

FIG. 2 further illustrates a method of operation for passing solid particles through the hopper 1 of FIG. 1 utilizing the fluidizing plate of gas permeable material 10 to promote the flow of particulate matter. This incorporate aspects of the present disclosure and shows more of its upper cylindrical section 13 than does FIG. 1. FIG. 2 shows feeding the solid particles 40 into the upper end 24 of the upper cylindrical section 13 through an inlet 42. If desired the solid particles can be fed through an opening at a top wall (not shown) at the upper end of the upper cylindrical section 13, or the upper end of the upper cylindrical section 13 can be open to the atmosphere by having no top wall. Then the solid particles 40 pass downwardly through the hopper 1 and discharge from the discharge opening 11. The fluidizing gas from gas line 27 feeds the space between the lower gas impermeable converging section 15 and the fluidizing plate 10 and then passes from the space through the fluidizing plate 10 to fluidize the solid particles above the interior surface of the fluidizing plate 10.

Figure 3:
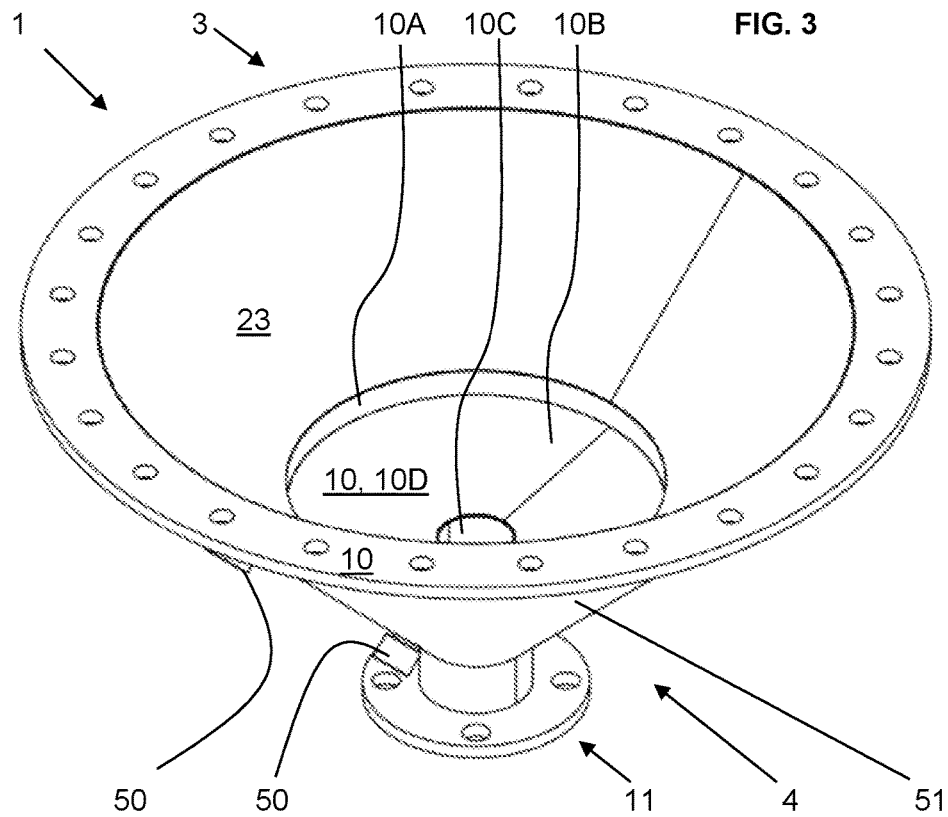
FIG. 3 illustrates a perspective view of an embodiment of the hopper assembly of FIG. 1, according to the present invention.

The method of operation of a hopper employing the apparatus of FIG. 3 occurs in the same way except fluidizing gas is also fed to the space between impermeable converging section 12 and upper gas permeable membrane 23 and then passes from the space through the upper gas permeable membrane 23 to fluidize the solid particles above the interior surface of the upper gas permeable membrane 23.

Employing a Single Conical Outer Wall

FIGS. 3-7 illustrate a single frusto conical wall 41 of gas impermeable material having a single continuous slope to replace the outer walls of the upper converging section 12, intermediate section 17, the lower converging section 15, and an upper portion of the discharge section 11. FIG. 3 illustrates a perspective view, and FIG. 4 illustrates a cross-sectional side view, of the embodiment employing the single frusto conical wall 41 as the outer wall. FIG. 4 shows that the discharge section 11 also has a lower cylindrical conduit 11A of gas impermeable material as an outer wall for a lower portion of the discharge section 11. Thus, an upper portion of the frusto conical wall 41 represents the outer sidewalls 9 of the upper converging section 12. A lower portion of the frusto conical wall 41 represents the outer sidewalls 15 of the lower converging section 15 and a portion of the discharge section 11. An intermediate portion of the frusto conical wall 41 represents the outer sidewalls of the intermediate section 17. Although not shown, the upper end of the frusto conical wall 41 may be attached to the lower end of the cylindrical sidewalls 24 in place of the outer sidewalls 9.

Within the frusto conical wall 41 is the upper gas permeable material 23 and the lower gas permeable material 10D. A cylindrical portion 10A of the gas permeable material 10D lines the intermediate section 17. A frustoconical portion 10B of the lower gas permeable material 10D provides the fluidization plate 10 that lines the lower converging section 15. A cylindrical portion 10C of the lower gas permeable material 10D lines the discharge section 11. Thus, the portion 10C of the lower gas permeable member 10 defines the inlet and discharge openings of the discharge section 11.

Figure 5:
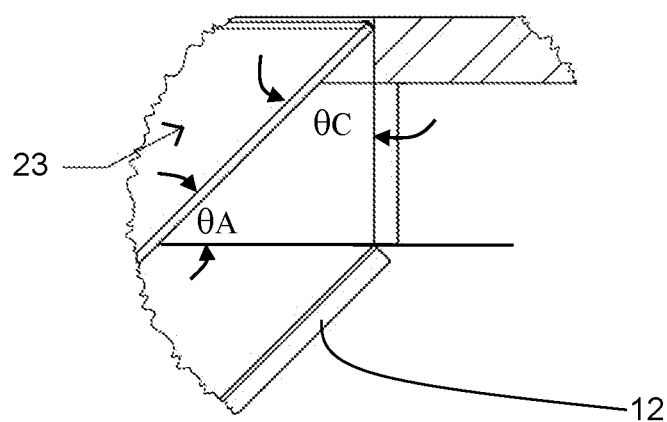
FIG. 5 is an enlarged view of portion A of FIG. 4.
Figure 6:
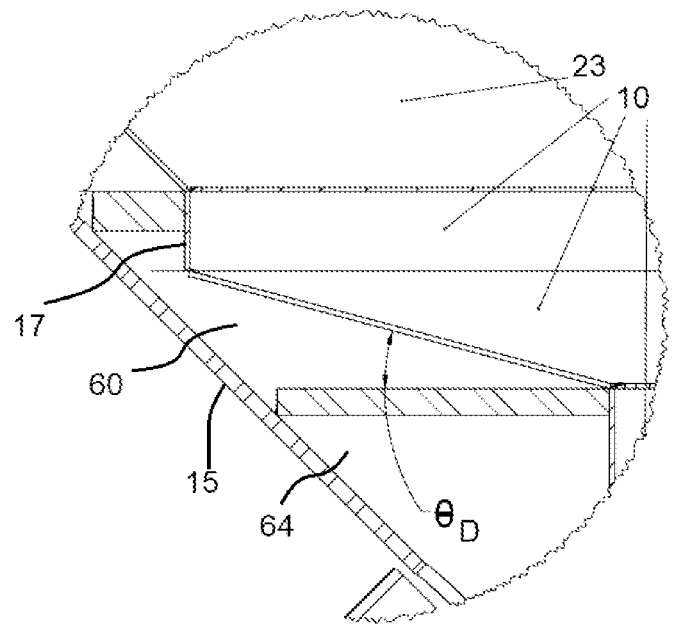
FIG. 6 is an enlarged view of portion B of FIG. 4.
Figure 7:
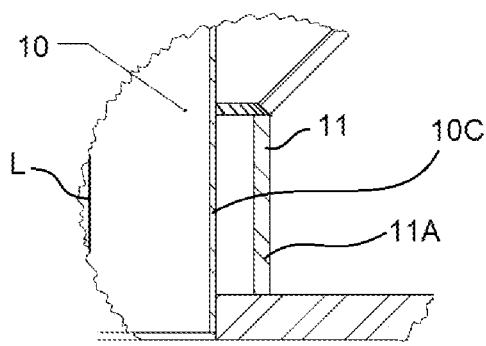
FIG. 7 is an enlarged view of portion C of FIG. 4.

FIGS. 5, 6 and 7 are detailed views of portions of the hopper assembly 1 of FIG. 4. FIG. 5 is an enlarged view of section "A" of FIG. 4. FIG. 6 is an enlarged view of section "B" of FIG. 4. FIG. 7 is an enlarged view of section "C" of FIG. 4.

The portion 10B of the gas permeable member 10 lining the lower converging section 15 has the horizontal slope angle $\theta_D$ described above. Thus, the gas permeable sidewalls 10 of the lower converging section 15 are oriented at a slope angle $\theta_D$ between ten degrees and fifteen degrees (10°-15°)

The upper gas permeable member 23 has the vertical slope angle $\theta_A$ and the horizontal slope angle $\theta_C$ described above. A typical range of the horizontal slope angle $\theta_A$ is 40 to 70 degrees, preferably 40-50° and, more preferably about 45°. The portion of the wall that represents upper converging section 12 may also have the same vertical slope angle $\theta_A$ and horizontal slope angle $\theta_C$ as the gas permeable member 23. A typical range of vertical slope angle $\theta_C$ is 20 to 50 degrees, preferably 40-50° and, more preferably about 45°.

As shown, the hopper assembly 1 includes fittings or couplings 50 on the conical sections 12, 15 to which gas lines 27 (and/or 29) may be connected to supply gas as described above. The gas lines 27 (and/or 29) may be connected to supply gas couplings 50 that are openings through which fluid communication between an exterior of the hopper assembly 1 and an interior space thereof may be established. Gas spaces or areas 60, 62, 64 are defined between the upper and lower conical sections 12, 15 and the respective permeable members 23, 10. The gas couplings 50 are in fluid communication with the gas spaces 60, 62, 64 such that air or other suitable gas may be introduced or injected there-through into the gas spaces 60, 62, 64. The gas couplings 50 may be provided in line with each other or, as shown in FIG. 5, the gas couplings 50 may be off-set from each other such that they extend from an outer surface of the hopper assembly 1 in one or more different planes. Also, one or more of the gas spaces 60, 62, 64 may be interconnected with each other, and/or one or more of the gas spaces 60, 62, 64 may be compartmentalized and sealed from one or more other gas spaces such that gas flow there-through is established by its own unique coupling 50.

CLAUSES OF THE INVENTION

The following clauses describe additional aspects relating to the present invention.

Clause 1. A hopper for containing and discharging particulate material, the hopper comprising:
an upper converging section formed of:
  a first gas impermeable, preferably frustoconical or cylindrical, outer wall section having an exterior surface and an interior surface, and an upper frusto-conical gas permeable wall lining the interior surface of the first gas impermeable outer wall of the upper converging section, the upper frusto-conical gas permeable wall being spaced from the interior surface of the first gas impermeable outer wall of the upper converging section to define an upper space between the upper frusto-conically configured gas permeable wall and the interior surface of the first gas impermeable outer wall of the upper converging section, the upper frusto-conical gas permeable wall having a first slope,
a lower converging section formed of:
  a second gas impermeable, preferably frustoconical or cylindrical, outer wall section having an exterior surface and an interior surface, and
  a lower frusto-conically configured gas permeable wall lining the interior surface of the second gas impermeable outer wall of the lower converging section,
  the lower frusto-conical gas permeable wall being spaced from the interior surface of the second gas impermeable outer wall of the lower converging section to define a lower space between the lower frusto-conically configured gas permeable wall and the interior surface of the second gas impermeable outer wall of the lower converging section, the lower frusto-conical gas permeable wall having a second slope,
an intermediate connecting section between the upper converging section and lower converging section, wherein an upper end of the intermediate connecting section is in communication with a lower end of the upper converging section, wherein a lower end of the intermediate section is in communication with an upper end of the lower converging section, the intermediate connecting section formed of:
  a third gas-impermeable, preferably cylindrical, outer wall section having opposed upper and lower ends respectively connected to the first gas impermeable outer wall section and the second gas impermeable outer wall section,
a discharge section defining a lower discharge opening for discharging solid particles from the hopper, wherein a lower portion of the lower converging section is in communication with the lower discharge opening; and
  wherein the upper frusto-conically configured gas permeable wall first slope is steeper than the lower frusto-conically configured gas permeable wall second slope,
  wherein the upper frusto-conically configured gas permeable wall is configured to fluidize material located above the upper frusto-conically configured gas permeable wall in a manner to facilitate passage of solid particles through the upper converging section to the intermediate section,
  wherein the lower frusto-conically configured gas permeable wall is configured to fluidize material located above the lower frusto-conically configured gas permeable wall in a manner to facilitate passage of the solid particles through the lower discharge opening of the lower converging section.

Clause 2. The hopper of Clause 1, wherein the upper frusto-conically configured gas permeable wall is a first gas permeable membrane and wherein the lower frusto-conically configured gas permeable wall is a second gas permeable membrane.

Clause 3. The hopper of Clause 1 or 2, wherein the discharge section is lined with a third gas permeable membrane.

Clause 4. The hopper of any of the above Clauses, wherein the first gas permeable membrane of the upper frusto-conically configured gas permeable wall comprises at least two layers of metallic screen.

Clause 5. The hopper of any of the above Clauses, wherein the gas permeable membrane of the upper lower frusto-conically configured gas permeable wall comprises a porous stainless steel sheet.

Clause 6. The hopper of any of Clauses 1 to 4, wherein the first gas permeable membrane of the upper frusto-conically configured gas permeable wall comprises at least two layers of metallic screen and wherein the second gas permeable membrane of the lower frusto-conically configured gas permeable wall comprises at least two layers of metallic screen.

Clause 7. The hopper of Clause 6, wherein the first gas permeable membrane of the upper frusto-conically configured gas permeable wall comprises comprise a first porous stainless steel sheet and wherein the second gas permeable membrane of the lower frusto-conically configured gas permeable wall comprises a second porous stainless steel sheet.

Clause 8. The hopper of Clause 1, wherein the upper frusto-conically configured gas permeable wall and/or the lower frusto-conically configured gas permeable wall respectively comprise at least two layers of porous metallic screen compressed and welded together.

Clause 9. The hopper of Clause 8, wherein each of the at least two layers of metallic screen have different mesh sizes.

Clause 10. The hopper of Clause 1, wherein the upper frusto-conically configured gas permeable wall comprises a gas permeable membrane.

Clause 11. The hopper of any of the above Clauses, wherein the slope of the lower frusto-conically configured gas permeable wall relative to a phantom horizontal line perpendicular to a longitudinal axis of the hopper is 10 to 15 degrees and the slope of the upper frusto-conically configured gas permeable wall is 20 to 50 degrees relative to a phantom horizontal line perpendicular to a longitudinal axis of the hopper.

Clause 12. The hopper of any of Clauses 1 to 10, wherein the slope of the lower frusto-conically configured gas permeable wall is 10 to 15 degrees relative to a phantom horizontal line perpendicular to a longitudinal axis of the hopper and the slope of the upper frusto-conically configured gas permeable wall is 40 to 50 degrees relative to a phantom horizontal line perpendicular to a longitudinal axis of the hopper.

Clause 13. The hopper of any of the above Clauses, wherein the upper conical section has a gas introduction hole for feeding opening to the upper space, and/or wherein the lower conical section has a gas introduction opening for feeding gas to the lower space.

Clause 14. The hopper of Clause 1, wherein the intermediate section is unlined.

Clause 15. The hopper of Clause 1, wherein the intermediate section is lined with a fourth gas permeable membrane.

Clause 16. The hopper of any of the above Clauses, wherein the upper frusto-conically configured gas permeable wall and/or the lower rigid gas permeable material has a substantially uniform permeability.

Clause 17. The hopper of Clause 11, wherein the hopper further comprises an upper gas impermeable cylindrical section, wherein a lower end of the upper gas impermeable cylindrical section is connected to an upper end of the upper gas impermeable converging section and in communication with the upper frusto-conically configured gas permeable wall.

Clause 18. A hopper system adapted for storing particulate matter, comprising:
  the hopper of any of Clauses 1 to 17; and a gas supply system for supplying pressurized gas into the upper fluidization
  space and the lower fluidization space.

Clause 19. The hopper system of Clause 18, wherein the gas supply system comprises:
  a main gas supply line connectable to a source of pressurized gas for supplying pressurized gas into the lower space defined between the lower converging section interior surface and the lower rigid gas permeable material; and
  a branch gas line for supplying pressurized gas into the upper space defined between the upper conical section interior surface and the upper frusto-conically configured gas permeable wall.

Clause 20. A method for passing solid particles through the hopper system of any of Clauses 18 or 19, wherein the hopper further comprises an upper gas impermeable cylindrical section, wherein a lower end of the upper gas impermeable cylindrical section is connected to an upper end of the upper gas impermeable converging section and in communication with the upper frusto-conically configured gas permeable wall, the method comprising:
feeding the solid particles to the upper cylindrical section of the hopper,
  passing the solid particles downwardly from a lower end of the upper cylindrical section into an upper end of the upper frusto-conically configured gas permeable wall lining the upper converging section interior surface;
  passing the solid particles downwardly from a lower end of the upper frusto-conically configured gas permeable wall into an upper end of the intermediate section;

passing the solid particles downwardly from a lower end of the intermediate section into an upper end of the lower frusto-conically configured gas permeable wall;

feeding gas to the upper space between the upper frusto-conically configured gas permeable wall section and the interior surface of the first gas impermeable wall, and passing the gas from the upper space through the upper frusto-conically configured gas permeable wall to form a fluidized gas boundary layer located above the lower frusto-conically configured gas permeable wall in a manner to facilitate passage of solid particles through the upper converging section; and feeding gas to the lower space between the lower frusto-conically configured gas permeable wall section and the interior surface of the second gas impermeable wall, and passing the gas from the lower space through the lower frusto-conically configured gas permeable wall to form a fluidized gas boundary layer located above the lower frusto-conically configured gas permeable wall in a manner to facilitate passage of solid particles through the lower converging section.

The disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The terms "proximal" and "distal" are defined herein relative to an operator of the equipment described herein. The term "proximal" refers to the position of an element closer to the operator and the term "distal" refers to the position of an element further away from the operator. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A hopper for containing and discharging particulate material, the hopper comprising:
    an upper converging section formed of:
        a first gas impermeable outer wall section having an exterior surface and an interior surface, and
        an upper frusto-conical gas permeable wall lining the interior surface of the first gas impermeable outer wall of the upper converging section, the upper frusto-conical gas permeable wall being spaced from the interior surface of the first gas impermeable outer wall of the upper converging section to define an upper space between the upper frusto-conically configured gas permeable wall and the interior surface of the first gas impermeable outer wall of the upper converging section, the upper frusto-conical gas permeable wall having a first slope,
    a lower converging section formed of:
        a second gas impermeable outer wall section having an exterior surface and an interior surface, and
        a lower frusto-conically configured gas permeable wall lining the interior surface of the second gas impermeable outer wall of the lower converging section,
        the lower frusto-conical gas permeable wall being spaced from the interior surface of the second gas impermeable outer wall of the lower converging section to define a lower space between the lower frusto-conically configured gas permeable wall and the interior surface of the second gas impermeable outer wall of the lower converging section, the lower frusto-conical gas permeable wall having a second slope,
    an intermediate connecting section between the upper converging section and lower converging section, wherein an upper end of the intermediate connecting section is in communication with a lower end of the upper converging section, wherein a lower end of the intermediate section is in communication with an upper end of the lower converging section, the intermediate connecting section formed of:
        a third gas-impermeable outer wall section having opposed upper and lower ends respectively connected to the first gas impermeable outer wall section and the second gas impermeable outer wall section,
    a discharge section defining a lower discharge opening for discharging solid particles from the hopper, wherein a lower portion of the lower converging section is in communication with the lower discharge opening; and
        wherein the upper frusto-conically configured gas permeable wall first slope is steeper than the lower frusto-conically configured gas permeable wall second slope, wherein the upper frusto-conically configured gas permeable wall is configured to fluidize material located above the upper frusto-conically configured gas permeable wall in a manner to facilitate passage of solid particles through the upper converging section to the intermediate section, wherein the lower frusto-conically configured gas permeable wall is configured to fluidize material located above the lower frusto-conically configured gas permeable wall in a manner to facilitate passage of the solid particles through the lower discharge opening of the lower converging section.

2. The hopper of claim 1,
wherein the first gas impermeable outer wall section is frustoconical or cylindrical;
wherein the second gas impermeable outer wall section is frustoconical or cylindrical; and
wherein the third gas impermeable outer wall section is frustoconical or cylindrical.

3. The hopper of claim 1, wherein the upper frusto-conically configured gas permeable wall is a first gas permeable membrane and wherein the lower frusto-conically configured gas permeable wall is a second gas permeable membrane.

4. The hopper of claim 1, wherein the discharge section is lined with a third gas permeable membrane.

5. The hopper of claim 1, wherein the first gas permeable membrane of the upper frusto-conically configured gas permeable wall comprises at least two layers of metallic screen.

6. The hopper of claim 5, wherein the gas permeable membrane of the upper lower frusto-conically configured gas permeable wall comprises a porous stainless steel sheet.

7. The hopper of claim 1, wherein the first gas permeable membrane of the upper frusto-conically configured gas permeable wall comprises at least two layers of metallic screen and wherein the second gas permeable membrane of the lower frusto-conically configured gas permeable wall comprises at least two layers of metallic screen.

8. The hopper of claim 7, wherein the first gas permeable membrane of the upper frusto-conically configured gas permeable wall comprises comprise a first porous stainless steel sheet and wherein the second gas permeable membrane of the lower frusto-conically configured gas permeable wall comprises a second porous stainless steel sheet.

9. The hopper of claim 1, wherein the upper frusto-conically configured gas permeable wall and/or the lower frusto-conically configured gas permeable wall respectively comprise at least two layers of porous metallic screen compressed and welded together.

10. The hopper of claim 9, wherein each of the at least two layers of metallic screen have different mesh sizes.

11. The hopper of claim 1, wherein the upper frusto-conically configured gas permeable wall comprises a gas permeable membrane.

12. The hopper of claim 1, wherein the slope of the lower frusto-conically configured gas permeable wall relative to a phantom horizontal line perpendicular to a longitudinal axis of the hopper is 10 to 15 degrees and the slope of the upper frusto-conically configured gas permeable wall is 20 to 50 degrees relative to a phantom horizontal line perpendicular to a longitudinal axis of the hopper.

13. The hopper of claim 1, wherein the slope of the lower frusto-conically configured gas permeable wall is 10 to 15 degrees relative to a phantom horizontal line perpendicular to a longitudinal axis of the hopper and the slope of the upper frusto-conically configured gas permeable wall is 40 to 50 degrees relative to a phantom horizontal line perpendicular to a longitudinal axis of the hopper.

14. The hopper of claim 1, wherein the upper conical section has a gas introduction hole for feeding opening to the upper space, and/or wherein the lower conical section has a gas introduction opening for feeding gas to the lower space.

15. The hopper of claim 1, wherein the intermediate section is unlined.

16. The hopper of claim 1, wherein the intermediate section is lined with a fourth gas permeable membrane.

17. The hopper of claim 1, wherein the upper frusto-conically configured gas permeable wall and/or the lower rigid gas permeable material has a substantially uniform permeability.

18. The hopper of claim 11, wherein the hopper further comprises an upper gas impermeable cylindrical section, wherein a lower end of the upper gas impermeable cylindrical section is connected to an upper end of the upper gas impermeable converging section and in communication with the upper frusto-conically configured gas permeable wall.

19. A hopper system adapted for storing particulate matter, comprising:
the hopper of claim 1; and
a gas supply system for supplying pressurized gas into the upper fluidization space and the lower fluidization space.

20. The hopper system of claim 19, wherein the gas supply system comprises:
a main gas supply line connectable to a source of pressurized gas for supplying pressurized gas into the lower space defined between the lower converging section interior surface and the lower rigid gas permeable material; and
a branch gas line for supplying pressurized gas into the upper space defined between the upper conical section interior surface and the upper frusto-conically configured gas permeable wall.

21. A method for passing solid particles through the hopper system of claim 19, wherein the hopper further comprises an upper gas impermeable cylindrical section, wherein a lower end of the upper gas impermeable cylindrical section is connected to an upper end of the upper gas impermeable converging section and in communication with the upper frusto-conically configured gas permeable wall, the method comprising:
feeding the solid particles to the upper cylindrical section of the hopper,
passing the solid particles downwardly from a lower end of the upper cylindrical section into an upper end of the upper frusto-conically configured gas permeable wall lining the upper converging section interior surface;
passing the solid particles downwardly from a lower end of the upper frusto-conically configured gas permeable wall into an upper end of the intermediate section;
passing the solid particles downwardly from a lower end of the intermediate section into an upper end of the lower frusto-conically configured gas permeable wall;
feeding gas to the upper space between the upper frusto-conically configured gas permeable wall section and the interior surface of the first gas impermeable wall, and passing the gas from the upper space through the upper frusto-conically configured gas permeable wall to form a fluidized gas boundary layer located above the lower frusto-conically configured gas permeable wall in a manner to facilitate passage of solid particles through the upper converging section; and feeding gas to the lower space between the lower frusto-conically configured gas permeable wall section and the interior surface of the second gas impermeable wall, and passing the gas from the lower space through the lower frusto-conically configured gas permeable wall to form a fluidized gas boundary layer located above the lower frusto-conically configured gas permeable wall in a manner to facilitate passage of solid particles through the lower converging section.

* * * * *